United States Patent
Wakeman (10) Patent No.: US 10,683,946 B2
(45) Date of Patent: Jun. 16, 2020

(54) COMBINATION AIR RELEASE, DEGASSING AND VACUUM RELIEF VALVE

(71) Applicant: Plast-O-Matic Valves, Inc., Cedar Grove, NJ (US)

(72) Inventor: Gregory P. Wakeman, West Orange, NJ (US)

(73) Assignee: Plast-O-Matic Valves, Inc., Cedar Grove, NJ (US)

(*) Notice: Subject to any disclaimer, the term of this patent is extended or adjusted under 35 U.S.C. 154(b) by 330 days.

(21) Appl. No.: 15/420,702

(22) Filed: Jan. 31, 2017

(65) Prior Publication Data

US 2018/0216741 A1 Aug. 2, 2018

(51) Int. Cl.
| | |
|---|---|
| *F16K 17/19* | (2006.01) |
| *F16K 33/00* | (2006.01) |
| *F16K 24/00* | (2006.01) |
| *F16K 31/26* | (2006.01) |
| *F16K 24/04* | (2006.01) |
| *F16K 24/06* | (2006.01) |
| *F16T 1/24* | (2006.01) |

(52) U.S. Cl.
CPC ............. *F16K 17/19* (2013.01); *F16K 24/00* (2013.01); *F16K 24/048* (2013.01); *F16K 24/06* (2013.01); *F16K 33/00* (2013.01); *F16K 31/26* (2013.01); *F16T 1/24* (2013.01)

(58) Field of Classification Search
CPC ...... F16K 17/194; F16K 24/00; F16K 24/042; F16K 24/048; F16K 24/06; F16K 31/26; F16K 33/00; F16T 1/22; F16T 1/24; Y10T 137/3099; Y10T 137/7426; Y10T 137/7439
See application file for complete search history.

(56) References Cited

U.S. PATENT DOCUMENTS

| | | | | |
|---|---|---|---|---|
| 951,172 | A | * 3/1910 | Biedenmieister | ....... F16K 31/26 137/444 |
| 1,710,848 | A | * 4/1929 | Turek | ..................... F24D 19/087 137/202 |
| 1,873,403 | A | 8/1932 | Higgins | |
| 1,885,348 | A | 11/1932 | Higgins | |
| 2,089,741 | A | 8/1937 | Gaines | |
| 2,204,788 | A | 6/1940 | Borden | |
| 2,247,930 | A | * 7/1941 | Turner | .................. F16K 24/044 137/198 |

(Continued)

FOREIGN PATENT DOCUMENTS

DE      2755938 A1 * 7/1978 ........... F16K 24/048

*Primary Examiner* — Mary E McManmon
*Assistant Examiner* — Richard K Durden
(74) *Attorney, Agent, or Firm* — Millen White Zelano & Branigan, PC; Brion P. Heaney (57) ABSTRACT

A valve for removing gases during the startup of liquid handling facilities and/or the filling of liquid storage facilities includes a housing and internal parts which include a highly buoyant float, a pivotal linkage member, a valve guiding member, and a poppet valve. The poppet valve includes a passage there through that allows for degassing of the liquid handling facility or liquid storage facility. The valve also provides for degassing of such facilities when gases build up therein, and provides for vacuum relief when an internal vacuum is produced in such facilities due to removal of liquid.

22 Claims, 5 Drawing Sheets

(56) References Cited

U.S. PATENT DOCUMENTS

| | | | | |
|---|---|---|---|---|
| 2,812,772 A * | 11/1957 | Moore | | F04D 9/065 |
| | | | | 137/142 |
| 3,018,787 A * | 1/1962 | Kirk, Jr. | | F16K 24/048 |
| | | | | 137/202 |
| 3,568,695 A | 3/1971 | Defrees | | |
| 3,834,415 A * | 9/1974 | Herron | | F16K 24/044 |
| | | | | 137/202 |
| 4,011,884 A * | 3/1977 | Drori | | F16K 24/042 |
| | | | | 137/202 |
| 4,209,032 A | 6/1980 | Drori | | |
| 4,230,142 A * | 10/1980 | Saarem | | F16K 24/048 |
| | | | | 137/202 |
| 4,381,928 A | 5/1983 | Roffelsen | | |
| 4,696,321 A | 9/1987 | Reese et al. | | |
| 4,784,175 A * | 11/1988 | Hicks | | A61M 1/0049 |
| | | | | 137/202 |
| 5,386,844 A * | 2/1995 | Kennedy | | F16K 24/048 |
| | | | | 137/202 |
| 5,613,513 A * | 3/1997 | Makowan | | F16K 24/046 |
| | | | | 137/1 |
| 5,937,889 A | 8/1999 | Krieg | | |
| 6,513,541 B1 | 2/2003 | Herlihy | | |
| 6,893,485 B2 | 5/2005 | MacDuff | | |
| 6,904,931 B2 | 6/2005 | Stephens | | |
| 7,481,238 B2 | 1/2009 | Ramoth | | |
| 8,474,478 B2 | 7/2013 | Peters | | |
| 8,776,822 B2 | 1/2014 | McIntire | | |
| 9,200,718 B2 | 12/2015 | Cardia et al. | | |
| 2006/0086388 A1 | 4/2006 | Fye | | |
| 2007/0034256 A1 * | 2/2007 | Ramoth | | F16K 24/048 |
| | | | | 137/202 |
| 2012/0318794 A1 | 12/2012 | Patil et al. | | |
| 2013/0092255 A1 | 4/2013 | Lang, III et al. | | |
| 2014/0251449 A1 | 9/2014 | Chen | | |
| 2015/0047716 A1 * | 2/2015 | Muir | | F16L 55/07 |
| | | | | 55/7 |
| 2016/0047447 A1 | 2/2016 | Cardia et al. | | |

* cited by examiner

COMBINATION AIR RELEASE, DEGASSING AND VACUUM RELIEF VALVE

The invention relates to release or venting valves that allow for the escape of gas, particularly air, from pipelines or other fluid distribution systems and fluid storage systems when the pipeline or system is being filled. Such valves allow for the gas to be displaced by the incoming liquid and vented from the pipeline or system. Further, the invention relates to venting valves that permit gases that accumulate within the pipeline or system to be vented therefrom. In addition, the invention also relates to vacuum relief valves which permit the entry of ambient air into the pipeline/system to prevent damage thereto as a result of negative pressures.

When introducing liquid into a pipeline or storage system, the pipeline or system must be provided with a venting valve to allow the displaced air to escape. This venting valve must also be capable of preventing the liquid from passing through the valve which would lead to leakage or spillage that could result in damage to equipment and/or the environment in general.

Additionally, pipelines and fluid distribution systems can have areas of higher and lower elevations. At higher points within the pipeline or system, gas, typically air, can accumulate. Such gas can be the result of leaks in the pipeline/system, or can result from dissolved/suspended gasses within the liquid being released in the pipeline/system. These gas accumulations can reduce the flow of liquid in the pipeline by reducing the cross sectional area for flow. If the pockets of accumulated gas become large enough they could stop the flow of liquid entirely. To address this problem, venting valves are commonly used at high points within the pipeline/system to permit the release of such pockets of accumulated gas.

Another possible problem can occur when fluid flow through the pipeline or fluid distribution system is interrupted or when leak(s) occur in the pipeline/system. These can cause a significant decrease in internal pressure that may lead to damage to the pipeline/system. In such cases, vacuum breaker valves are used to admit ambient air into the pipeline/system to reduce the pressure differential.

Valves that provide one or more of these operations are well known. See, for example, Higgins (U.S. Pat. No. 1,873,403), Higgins (U.S. Pat. No. 1,885,348), Gaines, (U.S. Pat. No. 2,089,741), Borden (U.S. Pat. No. 2,204,788), DeFrees (U.S. Pat. No. 3,568,695), Drori (U.S. Pat. No. 4,011,884), Drori (U.S. Pat. No. 4,209,032), Roffelsen (U.S. Pat. No. 4,381,928), Reese et al. (U.S. Pat. No. 4,696,321), Kreig (U.S. Pat. No. 5,937,889), Herlihy (U.S. Pat. No. 6,513,541), Stephens (U.S. Pat. No. 6,904,931), Ramoth (U.S. Pat. No. 7,481,238), Peters (U.S. Pat. No. 8,474,478), McIntire (U.S. Pat. No. 8,776,822), Cardia et al. (U.S. Pat. No. 9,200,718), Fye (US 2006/0086388), Patil et al. (US 2012/0318794), Lang, III et al. (US 2013/0092255), Chen (US 2014/0251449), and Cardia et al. (US 2016/00474477).

Stephens (U.S. Pat. No. 6,904,931) discloses a vacuum breaker valve that prevents backflow from a liquid outlet line to a liquid supply line when a drop in pressure occurs in the liquid supply line. The valve has an axial positioned liquid inlet connected to a liquid supply line, at liquid outlet at a right angle to the liquid inlet which is connected to a liquid discharge line, a vent opening in alignment with liquid inlet, and a floating valve piston in axial alignment with the liquid inlet and the vent opening.

When pressurized liquid flows into the liquid inlet, the floating valve moves to an up position, thereby permitting liquid to flow through the liquid inlet, through the liquid outlet, and into the discharge line, and preventing liquid from passing through the vent opening. As pressure drops on the supply side, the valve position can move to an intermediate position. In this position liquid from the discharge side can flow past the valve to the vent opening where it is collected in a liquid capture and containment device. When a partial vacuum is created on the supply side, the floating valve moves to the lower position where it prevents fluid from the discharge side being drawn through the liquid inlet where it could contaminate the liquid supply. In this position, the liquid outlet communicates with the vent opening.

MacDuff (U.S. Pat. No. 6,893,485) describes a venting valve with an internal float for venting gas pockets from liquid distribution pipelines. As described therein, dissolved or suspended gases can separate from the liquids flowing through the distribution pipelines and accumulate at various points within the system. The valve system comprises a cylindrical housing that can be connected at one end to a standard pipe coupling and at the other end has a housing cap which supports a top valve with a valve cap that can be vented to de-aerate gas out of the housing. Positioned within the chamber defined by the housing is a float which is connected to a lever arm, which in turn is connected to a pivot support attached to the underside of the housing cap. The valve stem of the top valve is biased by a compression spring to seal a venting channel within the top valve. The valve stem engages the lever arm so that when a sufficient amount of gas accumulates in the housing chamber the level of liquid is displaced to an extent that the lever arm is pulled downward by the weight of the float. This causes the valve stem to move downward against the force of the compression spring, thereby opening the venting channel.

Reese et al. (U.S. Pat. No. 4,696,321) disclose an air release and vacuum breaker valve. The valve includes a float chamber, a ball float, a float connector that connects a first sleeve to the ball float, a second sleeve in which the first sleeve is movable and which is connected to a vacuum breaker valve disc, and an air release needle valve that operates in conjunction with the sleeves. As water level rises within the float chamber, the float ball moves upward causing first the needle valve to seat in a seating disc closing an air release orifice. As the water level continues to rise, float ball moves further upward now causing the vacuum breaker valve disc to seat against a ring seal, thereby sealing a vacuum opening.

If air accumulates in the float chamber, the level of water within the chamber decreases and the ball float will begin to move downward. Initially, both the air release valve and vacuum breaker valve will remain closed. As the ball float continues to move downward, the needle valve will move downwards becoming unseated, thereby opening the air release valve causing pressurized air to enter the float chamber. If there is a further decrease in pressure in the pipeline, the pressure differential will cause the vacuum breaker valve disc to move downward allowing the higher exterior pressure air to enter the valve and the pipeline.

Herlihy (U.S. Pat. No. 6,513,541) discloses a pipeline vent valve having a cylindrical housing, a bottom end which is connectable to a pipeline, and a top end which is closed by a closure housing having a central aperture to permit venting. Positioned within the housing is a first valve member which is connected to the closure housing via a flexible strap hinge, and which in its uppermost position sits against a valve seat around the central aperture of the closure housing. The first valve member is provided with a central passage which permits air to flow from the valve chamber to the atmosphere. Connected to the first valve member is a second valve member which is a flexible membrane. This second valve member is also attached to a float.

In the float's uppermost position, the second valve member is seated against the bottom of the first valve member, thereby sealing the central passage within the first valve member. Further, the first valve member is seated against the closure housing thereby sealing the central aperture therein. In an intermediate position, the float is lower in the chamber, unseating the second valve member thereby permitting fluid passage through the central passage within the first valve member. When the float is at its lowest position, the first valve member is unseated from the closure housing thereby permitting fluid flow through the central aperture of the closure housing.

Fye (US 2006/0086388) discloses a similar venting valve having a float which is connected to a pivoting arrangement. As the float moves, a pivot arm of the pivoting arrangement also moves. The pivot arm has a protrusion called a head which seals or unseals a venting port when the float is at its highest or lowest positions, respectively.

Ramoth (U.S. Pat. No. 7,481,238) discloses a degassing valve having a cylindrical housing attached at one end to a pipeline and closed at the other end by a closure plug which has a vent port there though. Within the housing there is provided a float chamber in which a float is positioned. The float is pivotally connected to the bottom surface of the closure plug by means of an actuator lever which in turn is provided with an elastic seat for sealing the inlet to the vent port in the closure plug. As liquid enters the float chamber, the float moves upward causing the actuator level to pivot, and brings the elastic seat into a sealing position whereby it seals the vent port in the closure plug.

An object of this invention is to provide a valve capable of three basic functions. First, the valve provides a means to release gas (e.g., air) in a piping system or storage system while it is being filled with liquid. The valve will also close when the pipeline or storage container is filled so that the liquid cannot escape through the valve. Second, the valve provides a means for accumulated gas (e.g., air) to escape from the pipeline or storage system. For example, ambient air can enter the pipeline or storage system via leaks, and/or soluble or suspended air within the fluid can eventually escape from the fluid, causing air pockets within the pipeline or storage system. The valve provides a means to vent such gases. Third, in the event of a pressure loss within the pipeline or system, the valve provides for atmospheric air to enter the system preventing the formation of a vacuum that could lead to collapse of a pipe, tank, or other equipment.

Upon further study of the specification and appended claims, other objects, aspects and advantages of the invention will become apparent.

These objects are achieved by a valve providing degassing, venting and vacuum breaking, the valve comprising:

a housing having a longitudinal axis and defining an internal chamber, the housing having a bottom end and an upper end, the bottom end having means to connect to a pipeline or liquid storage system, the housing having an inlet port at the bottom end of the housing to permit fluid communication between the internal chamber and the pipeline or liquid storage system (i.e., permit fluid to enter or exit the internal chamber);

a housing cap attached to the upper end of the housing, and an outlet vent in the housing cap for venting gas from the chamber and for permitting the entry of ambient gas into the chamber;

a float positioned within the chamber and being movable in the direction of the longitudinal axis within the chamber by liquid pressure;

a pivotal linkage member connected to the float whereby the linkage member pivots as the float moves up and down in the direction of the longitudinal axis, a poppet valve which interacts with the pivotal linkage member whereby as the pivotal linkage member pivots upwards due to upwards movement of the float the pivotal linkage member contacts the poppet valve and moves the poppet valve upwards to a valve seat position around the outlet vent in the housing cap, the poppet valve having a bottom inlet, a top outlet and a passageway connecting the bottom inlet and the top outlet whereby gas can pass through the bottom inlet, through the passageway, and discharge through the top outlet, and the pivotal linkage member having a valve seat which seals the bottom inlet of the poppet valve when the pivotal linkage member contacts the poppet valve.

According to another aspect of the invention, the inventive valve further comprises a valve guide member positioned within the chamber, above the float and below the poppet valve, for guiding the poppet valve in its movement in the direction of the longitudinal axis of the housing. The pivotal linkage member is attached to the valve guide member so that one end of the pivotal linkage member is attached to the float and the other end is attached to the valve guide member.

According to a further aspect of the invention, the float is free of spring bias. According to a further aspect of the invention, the poppet valve is free of spring bias. According to a further aspect of the invention, the valve is free of any spring bias.

According to a further aspect of the invention the poppet valve is not connected to any other part of the valve. The poppet valve is free to move in the axial direction between upper and lower positions. In uppermost position, the poppet valve is seated around the outlet vent in the housing cap. In the lowermost position, the poppet valve is resting against the valve guide member, the latter preventing further downward movement of the poppet valve.

The float does not cover the entire cross section of the chamber. As a result, gas entering the inlet port at the bottom end of the housing can flow into the chamber and around the float. Further, the valve guide member also does not cover the entire cross section of the chamber so that gas entering the chamber can flow through the valve guide member. For example, when the pipeline or system is being filled with pressurized liquid, the displaced gas from the pipeline/system can flow into the inlet port at the bottom end of the housing, into the chamber, around the float, through the valve guide member, and out the outlet vent in the housing cap.

The float preferably has a cross section that is similar to the shape of the internal chamber to facilitate axial movement of the float within the chamber. For example, if the housing is in the shape of a cylinder (which facilitates manufacture), and the internal chamber correspondingly has a cylindrical shape (which again facilitates manufacture), the float will preferably have a circular cross section, albeit a circular cross section of smaller diameter than the circular cross section of the internal chamber.

The float is also preferably provided with leg members extending from the upper region of the float in the radial direction and/or provided with arm members extending from the lower region of the float in the radial direction. These leg and arm members interact with the internal surface of the chamber to guide the float as it moves up and down within the chamber. In addition, the leg members prevent the bottom of the float from blocking the inlet port at the bottom end of the housing.

To provide sufficient buoyancy the float is preferably hollow. In addition, to facilitate the passage of gas around the float when the pipeline or system is being filled with pressurized liquid, the bottom of the float is preferably tapered inwards. For example, if the float is cylindrical in shape (which facilitates manufacture) the bottom of the float is preferably in the shape of an inverted cone.

The valve guide member has an outer edge region which defines its outer perimeter. This outer edge region preferably corresponds in shape to the internal surface in the housing that defines the internal chamber. For example, if the internal chamber is cylindrical in shape, the outer edge region of the valve guide member is preferably ring shaped. Extending inwardly from the outer edge region, the valve guide member preferably exhibits a plurality of positioning arms. The ends of these positioning arms define a central region within the valve guide member within which the poppet valve can move up and down within the valve housing. Between the positioning arms there are passages that permit gases to pass through valve guide member.

According to a preferred aspect of the invention, the internal chamber has regions of different cross sections. The lower region in which the float moves has a first cross section and the upper region where the valve guide member is positioned has a second cross section, wherein the first cross section has a smaller diameter than the second cross section. This difference in diameters creates a ledge where the two cross sections meet, and the outer edge region of the valve guide member preferably rests on this ledge. In this way, the valve guide member need not be attached to the valve housing. The poppet valve is also preferably not attached to the valve housing or any other part of the valve. This arrangement provides for easy removal of the poppet valve and the valve guide member, linkage member and float to facilitate repair and replacement of these parts of the valve.

The pivotal linkage member is an elongated member having points of attachment at each end thereof. The linkage member is pivotally attached at one end of the elongate member to the float and is preferably attached at the other end of the elongated member to the valve guide member. The means for attaching the pivotal linkage member to the float and the valve guide member must be able to permit the linkage member to pivot as the float moves up and down in the chamber. Further, the elongated member is provided with an elastomeric disc at the point where the pivotal linkage member interacts with the poppet valve to help seal the bottom inlet of the poppet valve.

The pivoting connection of pivotal linkage member to the float can be achieved by a coupling member that comprises a wall extending vertically from the top of float. The wall has an elongated slot through which the end of the pivotal linkage member extends. To retain the end of the pivotal linkage member within the slot the end of the pivotal linkage member has a groove in which an O-ring 208 is mounted. The pivoting connection of pivotal linkage member to the valve guide member is provided by another coupling member that comprises a protrusion extending downwards from the valve guide member. This protrusion has an open ended slot and the second end of the pivotal linkage member is received within this slot and held therein by a fastening means which permits the second end to pivot. For example, the end of the pivotal linkage member can be held within the slot be a pin which extends through the protrusion and through the end of pivotal linkage member.

The poppet valve can be of various shapes. The cross section is preferably cylindrical to facilitate movement within the central region defined by the ends of the positioning arms of the valve guide member, and also to facilitate manufacture. The upper surface of the poppet valve is preferably flat so as to provide a sufficient seal around the outlet vent in the housing cap. The upper surface of the poppet valve is also provided with an elastomeric disk that acts as valve seat to seal the vent opening.

In a preferred embodiment that poppet valve has a lower conical section, a central cylindrical section, and an upper flange that extends outward from the top edge of the central cylindrical section. The bottom inlet of the poppet valve is positioned at a tip at the apex of the conical section. The passageway extends from the bottom inlet to the top outlet, which, for example, can be a central opening in the elastomeric valve seat on the top surface of the poppet valve.

The poppet valve is designed to be lightweight so that it does not hinder the float's ability to rise when the float is pushed up by liquid. In other words, for a given design the float will have a certain buoyancy force, and the components that rest on the float cannot be unnecessarily heavy so that they do not hinder the float's ability to rise. In addition, when gas accumulates in the chamber, the liquid is displaced causing the float to move downwards, and the pivotal linkage member to pivot downwards. In such a case, if the poppet valve remains in contact with the pivotal linkage member, the poppet valve would also move downwards. However, the design of the poppet valve is such that when the pressure in the chamber is sufficiently higher than the ambient pressure, the poppet valve can retain its seated position around the outlet vent in the housing cap. In such a case, since the poppet valve is no longer seated against the valve seat in the pivotal linkage member, the accumulated gas within the chamber can vent through the poppet valve via the bottom inlet, passageway, and top outlet, and then out through the outlet vent in the housing cap.

Figure 2:
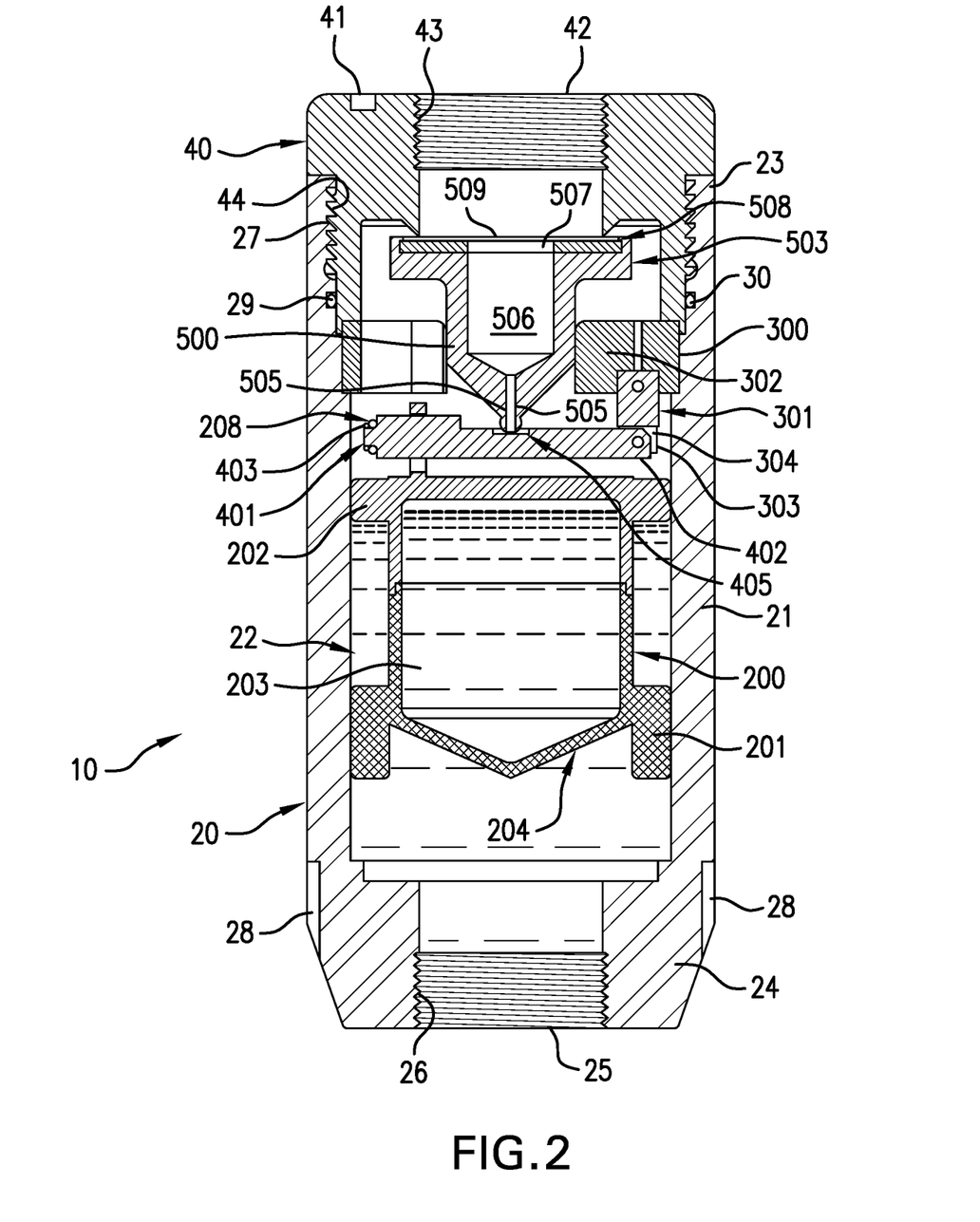
FIG. 2 illustrates an embodiment of the invention which shows the valve in the closed position when the fluid handling system or fluid containment device is filled with liquid.

When the poppet valve is seated around the vent opening in the housing cap, but not in contact with the valve seat on the pivotal linkage member, it is seated because the pressure inside the valve is sufficiently higher than the outside ambient pressure (as shown in FIG. 2). Since the area of the valve seat around the valve opening is relatively large (for example, in comparison to the area of the bottom inlet of the poppet valve), the pressure differential needed to keep the poppet valve seated around the vent opening can be relatively small (Force=Pressure×Area).

Figure 3:
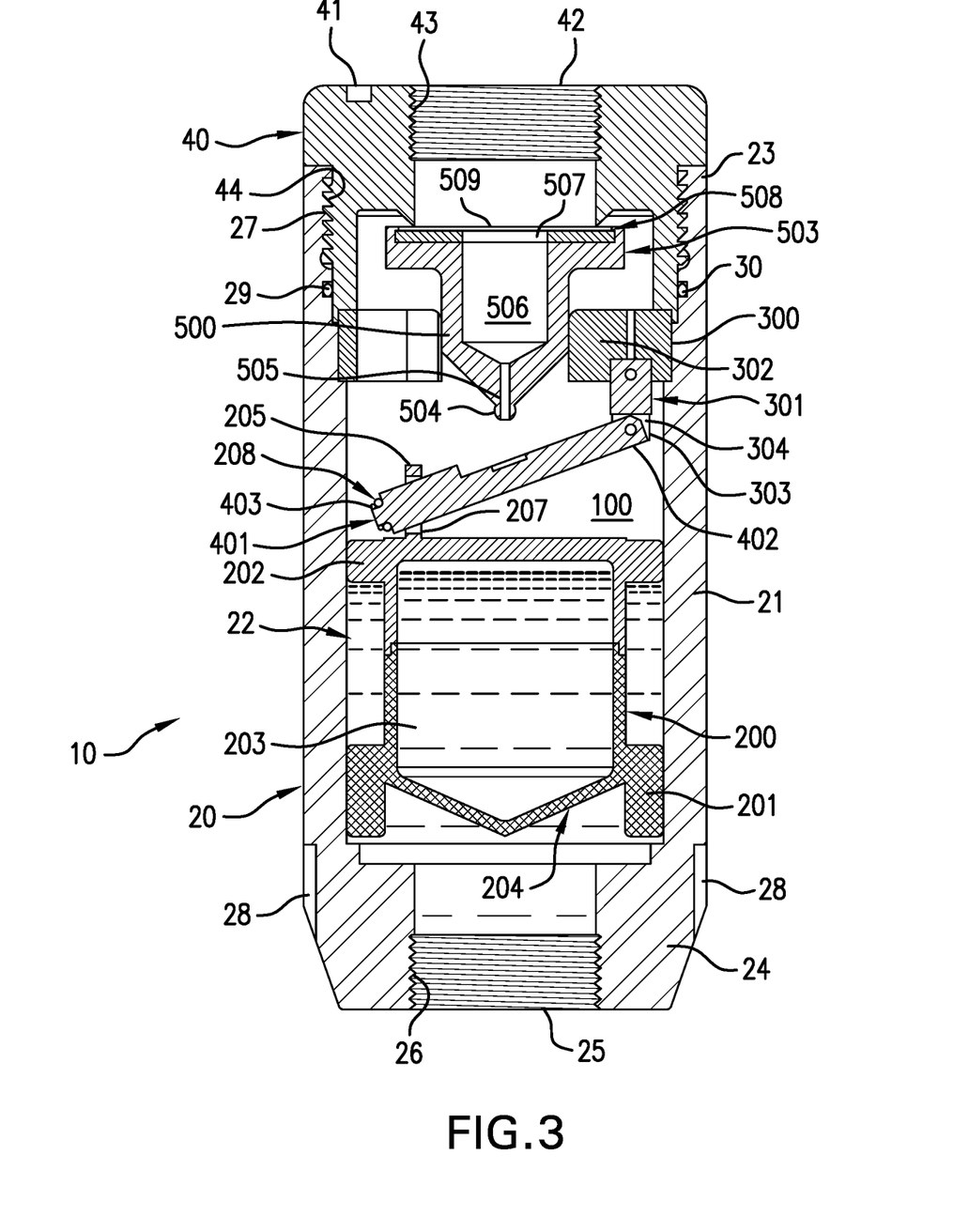
FIG. 3 illustrates an embodiment of the invention in which the valve is in the degassing mode.

As air (or another gas) accumulates inside the valve, the float will become surrounded by air. When the weight of the float (and the pivotal linkage member) overcomes the buoyant force from the air, the float will drop. As the float drops the pivotal linkage member also drops (pivots downward) such that the valve seat in the pivotal linkage member no longer seals the bottom inlet of the poppet valve. Since the poppet valve remains in its upper position due to the pressure differential, the bottom inlet of the poppet valve is now open and air from within can escape to the atmosphere (as shown in FIG. 3).

The area of the bottom inlet of the poppet valve should be of a size so as not to hinder movement of the poppet valve. If the bottom inlet is too large, then the force across this orifice in the upper direction can hinder the float from dropping. When the area of bottom inlet is relatively small, the upward force can still be sufficiently high due to the pressure differential (high pressure within the valve) to maintain the poppet valve in its upper position. For example, if the pressure inside the valve is high (e.g., 150 psi), the area of the bottom inlet need not be very large to keep the poppet valve in its upper position.

Overall, the valve is designed such that, even if the pressure inside the valve is relatively high, the float will drop and the poppet valve will remain in its upper position seated around the outlet vent in the housing cap. By taking into account the weights of the valve components, pressures, and orifice diameters, the valve design assures that accumulating air will vent through while the poppet valve remains seated around the outlet vent in the housing cap.

If the pipeline/system experiences a significant pressure drop, the poppet valve will drop from its uppermost seated position due to the pressure differential (i.e., a higher pressure outside the valve than within the valve chamber). This will permit ambient gas to enter through the outlet vent in the housing cap, through the valve chamber, and into the pipeline/system, thereby preventing a partial vacuum from occurring within the pipeline/system which could lead to damage.

The weights of the float, the pivotal linkage member, the coupling member for attaching the pivotal linkage member to the float, and the poppet valve must be such that the float will rise with enough buoyant force to cause the elastomeric disk in the poppet valve to seat tightly against the vent opening in the housing cap to shut off the valve. Materials with a specific gravity of slightly less than 1 will float but may not necessarily provide enough buoyant force to close the valve tightly.

In preferred aspect of the invention, the float is hollow to provide enough buoyant force to close the valve tightly. The hollow float can be made by welding two hollowed out pieces together such that there is air trapped inside of the float. The weight of the pivotal linkage member and poppet must also be heavy enough to prevent the poppet from closing due to dynamic forces caused by the air impinging upon the poppet and float during the pipe or tank filling phase.

For a relatively small size valve assembly, the float will be comparably small as well. This would mean the density (thus weight) of the pivotal linkage member and poppet should be low, for example, with a specific gravity of near 1, since water is a very common fluid used in piping systems. If heavier materials are required (for example, for reasons of corrosion resistance or pressure rating), the hollow float can be made larger, thereby containing more air space to provide enough buoyant force to lift the other components, and also provide enough force to create a seal. Thus, a wide range of materials and specific gravity ratings is possible by increasing the size of the float, and thus assembly. Similarly, the physical size of the assembly can be varied to operate with fluids of varying specific gravity ratings. In summary, the physical size of the float (and thus the valve assembly) can be made larger or smaller to make the assembly function with valve parts made of different materials, and with fluids of different specific gravity ratings.

According to another aspect of the invention, there is provided a method for degassing, venting and/or vacuum breaking a pipeline, fluid distribution system, or fluid storage system, comprising connecting the pipeline, fluid distribution system, or fluid storage system to a valve in accordance with the invention.

According to another aspect of the invention, there is provided a pipeline, fluid distribution system, or fluid storage system that comprises a valve in accordance with the invention.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

Figure 1:
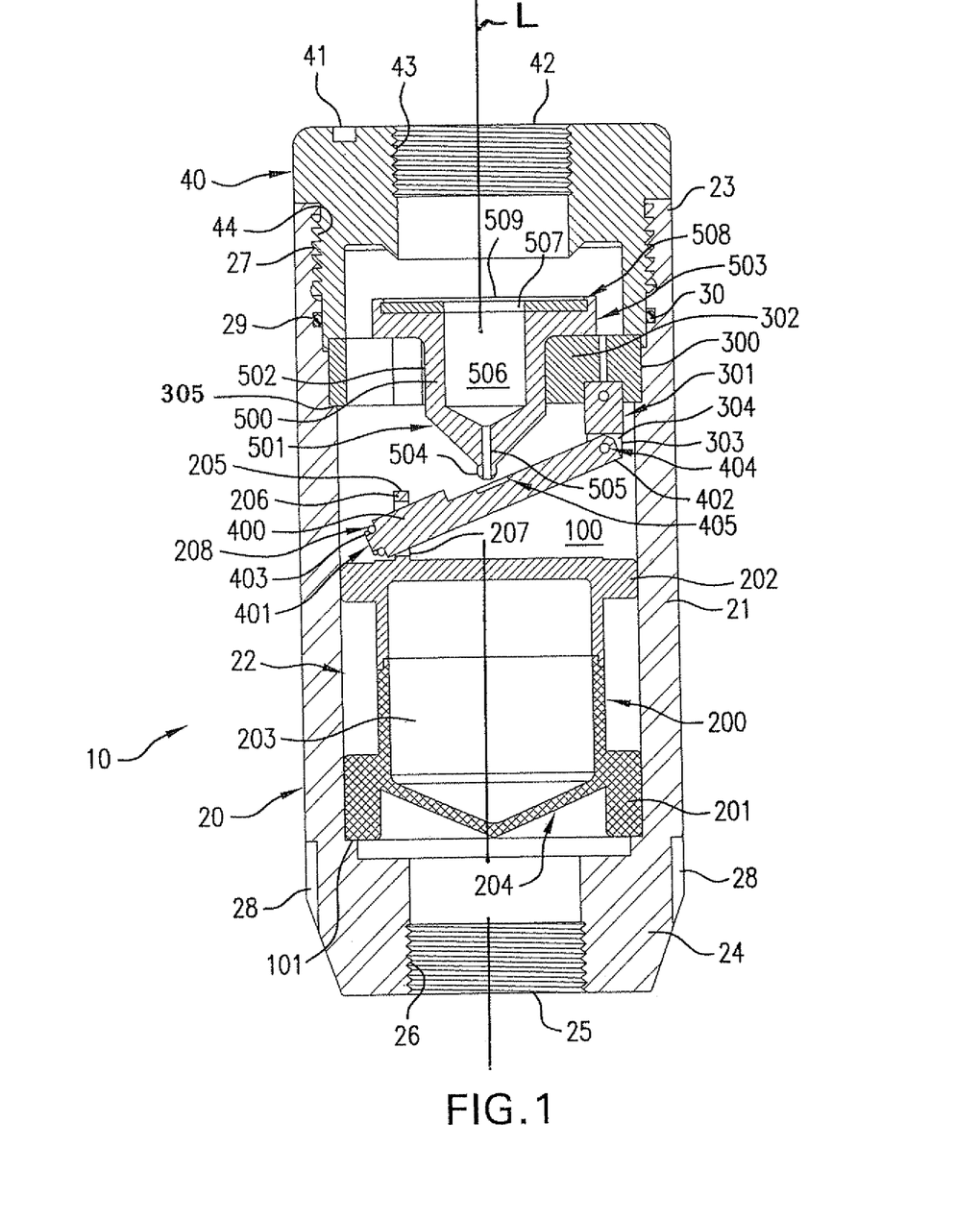
FIG. 1 illustrates an embodiment of the invention in which the valve is in the air release or venting mode (or vacuum release mode)

An embodiment of the combination valve 10 according to the invention is shown in FIG. 1. Combination valve 10 includes a tubular valve housing 20 having a longitudinal axis L. The valve housing 20 has a vertical wall 21 having an internal surface 22 which defines an internal chamber or cavity 100. In addition, valve housing 20 has an open upper end 23, and a bottom end 24. The bottom end 24 is provided with an inlet port 25 to permit fluid to enter (or exit) internal chamber 100 of the valve housing 20. The upper end 23 is provided with a housing lid or cap 40.

The bottom end 24 can be provided with any suitable attachment means for connecting valve 10 to a fluid handling system (e.g., a pipeline) or fluid containment device (e.g., storage tank). For example, as shown in FIG. 1, inlet port 25 is provided with internal threads 26 to permit connection of valve 10 to a threaded nipple in a fluid handling system or fluid containment device. Alternatively, inlet port 25 can include an externally threaded nipple extending from bottom end 24 for the connection of valve 10 to a threaded inlet of the fluid handling system or fluid containment device. Another alternative is to provide bottom end 24 with a flange that can be fastened to a flanged inlet of the fluid handling system or fluid containment device by suitable fastening means such as bolts.

The open upper end 23 of the valve housing 20 can be provided with any suitable attachment means for attaching the lid 40 to the valve housing 20. For example, as shown in FIG. 1, open upper end 23 is provided with internal threads 27 for connection with external threads 44 on lid 40. Alternatively, open upper end 23 can be provided with external threads for connection with internal threads on lid 40. Also, open upper end 23 and lid 40 can be attached by way of flanges and fastening means such as bolts, as discussed above. In addition, to facilitate sealing of lid 40 to valve housing 20, just below internal threads 27, internal surface 22 of the valve housing 20 is provided with a groove 29 for receiving an O-ring 30.

While the valve housing 20 and internal chamber 100 can be of various different shapes, preferably the vertical wall 21 and internal surface 22 are both of cylindrical shape. In addition, the external surface of vertical wall 21 can be provided with notches 28, for example, near bottom end 24, to facilitate attachment and removal of valve 10 from the fluid handling system or fluid containment device by use of a wrench.

Lid 40 is provided with an outlet vent 42 for discharge of gases from valve 10 or for introduction of gases, typically atmospheric air, into valve 10. As shown in FIG. 1, outlet vent 42 can be provided with internal threads 43 for connection of an additional device (e.g., piping). Alternatively, outlet vent 42 can include an externally threaded nipple extending from the top surface of lid 40 for connection of an additional device such as piping. This piping could be used to direct toxic or dangerous gases emitted from the process to a safe location elsewhere, e.g., a storage tank. However, it should be noted that such a connection could interfere with the valve's ability to mitigate a pipeline failure, due to the occurrence of a vacuum in the pipeline or tank, by preventing atmospheric air from flowing into the valve and then into the pipeline or storage facility via outlet vent 42.

In addition, lid 40 can be provided with two or more depressions 41 (blind holes) to facilitate attachment and removal by, for example, a suitable wrench. Alternatively, the external surface of lid 40 can be provided with notches (like notches 28 near bottom end 24 of the valve housing) to facilitate attachment and removal by use of a suitable wrench.

As shown in, for example, FIG. 1, positioned within internal chamber 100 of the valve housing 20 are float 200, valve guide member 300, pivotal linkage member 400, and poppet valve 500. Float 200 and valve guide member 300 are connected to one another via the pivotal linkage member 400. Float 200, valve guide member 300, pivotal linkage member 400, and poppet valve 500 are not connected to internal surface 22 of valve housing 20, but are instead removeably positioned within the internal chamber 100.

Float 200 is designed to have a sufficient buoyancy to rise within internal chamber 100 when a liquid enters into the internal chamber via inlet port 25. Preferably, float 200 is hollow. Near the bottom thereof, float 200 is provided with a plurality of leg members 201 that extend outward from float 200. Leg members 201 interact with a ridge or shoulder 101 that extends inward from a lower section of internal surface 22 to prevent further downward movement of float 200. As will be described in more detail below, when valve 10 is in a completely open position, float 200 is in its lowermost position in valve housing 20 with leg members 201 resting on ridge 101.

Leg members 201 also interact with internal surface 22 to guide float 200 as it moves up and down within internal chamber 100. Similarly, the top region of float 200 is provided with a plurality of arm members 202 that extend outward from float 200. Like leg members 201, the arm members 202 interact with internal surface 22 to guide float 200 as it moves up and down within internal chamber 100.

Float 200 can be of various shapes. For example, when the internal surface 22 of the valve housing 20 has a cylindrical shape, the main body 203 of float 200 is also preferably cylindrical. With both of these structures having cylindrical shapes, movement of float 200 within the internal chamber 100 is facilitated. In addition, the end portion 204 of float 200 preferably has an inverted conical shape. The conical bottom end portion 204 aids in the flow and distribution of fluid as it enters inlet port 25 and passes between leg members 201 into internal chamber 100.

The top of float 200 is pivotedly connected to a first end 401 of pivotal linkage member 400. The second end 402 of pivotal linkage member 400 is pivotally connected to valve guide member 300. Any suitable pivoting connection can be used that permits the pivotal linkage member 400 to pivot as float 200 moves up and down within internal chamber 100. In the embodiment shown in FIG. 1, a pivoting connection between the first end 401 of pivotal linkage member 400 and float 200 is achieved by means of a coupling member 205. Coupling member 205 comprises a wall 206, preferably unitary with float 200, which extends vertically from the top of float 200. Wall 206 has an elongated slot 207 therein through which the first end 401 of pivotal linkage member 400 extends. To retain the first end 401 of pivotal linkage member 400 within slot 207, and thereby maintain the connection between float 200 and the pivotal linkage member 400, an O-ring 208 is mounted in a groove 403 at the first end 401 of pivotal linkage member 400. The elongation of slot 207 permits the first end 401 of pivotal linkage member 400 to both slide and pivot within the slot as the float 200 moves up and down within internal chamber 100.

In the embodiment shown in FIG. 1, a pivoting connection between the second end 402 of pivotal linkage member 400 and the valve guide member 300 is achieved by means of a coupling member 301. Coupling member 301 comprises a protrusion 303, preferably unitary with valve guide member 300, which extends downward from the valve guide member 300 and has an open ended slot 304 therein. Second end 402 of pivotal linkage member 400 is received within slot 304 and held therein by a fastening means which permits the second end 402 to pivot. For example, second end 402 can be held within slot 304 by means of pin 404.

Pivotal linkage member 400 is also provided with a seat disc 405, positioned on the top surface of the pivotal linkage member at or near a midpoint thereof. As described further below, seat disc 405 interacts with a tip 504 of a tapered section 501 of poppet valve 500 to close and seal a channel 505 in tapered section 501.

Valve guide member 300 provides means for guiding poppet valve 500 as it moves upwards and downwards between sealed and opened positions. Unlike the float 200, pivotal linkage member 400 and poppet valve 500, the valve guide member 300 does not move during the operation of the valve. The valve guide member 300 rests on a ridge or shoulder 305 that extends inward from an upper portion of internal surface 22. The valve guide member 300 is held in place within the valve between shoulder 305 and the bottom edge of lid 40.

For valves with a cylindrically interior chamber 100, valve guide member 300 is preferably ring shaped. Thus, the valve guide member has an outer edge region that is ring-shaped and defines the outer perimeter of the valve guide member. Extending inwardly from this ring-shaped outer edge region of the valve guide member 300 is a plurality of positioning arms 302. The ends of these positioning arms 302 define a central region within valve guide member 300. It is within this central region that poppet valve 500 moves up and down within the valve structure. Further, between positioning arms 302 there are passages that permit gases to pass through valve guide member 300.

Poppet valve 500 has a tapered, preferably conical, section 501, a central, preferably cylindrical, section 502, and an upper flange 503 that extends outward from the top edge of the central section portion 502. Tapered section 501 is provided with a tip 504 located at or near the central axis of the tapered section 501. The tip 504 has an inlet which communicates with a channel 505 that extends from tip 504 through tapered section 501 to a central cavity 506. Central cavity 506 extends from the central portion 502 to an outlet 507 in the upper surface of flange 503. The top surface of poppet valve 500 is provided with a seat disc 508. Seat disc 508 is provided with a central opening 509 that corresponds to outlet 507. As a result, channel 505 is in fluid communication with central cavity 506 such that gas, for example, air, can enter channel 505 through the inlet at tip 504, pass through central cavity 506 and out outlet 507 via the central opening 509 in seat disc 508. This constitutes a small degassing passage which is discussed further below.

In operation, the valve 10 is attached to, for example, a pipeline so that inlet port 25 is in fluid communication with the pipeline. As the pipeline is filled with a liquid, gas within the pipeline (e.g., air) is displaced and passes through valve 10. The gas enters valve 10 though inlet port 25, passes around float 200, through the passages formed between positioning arms 302, and out of outlet vent 42. This constitutes the major gas flow passage through valve 10.

When the pipeline is being filled with liquid, the float 200 is initially in the position shown in FIG. 1, i.e., with leg members 201 resting on ridge 101. As liquid enters into valve 10 through inlet port 25, the highly buoyant float 200 begins to rise within the internal chamber 100 guided by leg members 201 and arm members 202. This in turn causes pivotal linkage member 400 to pivot upwards pushing poppet valve 500 upwards. During this pivoting action, tip 504 of the poppet valve 500 becomes seated on seat disc 405 of the pivotal linkage member 400, thereby sealing the opening to channel 505 (see FIG. 2).

As the float 200 rises, gas (e.g., air) within the internal chamber 100 continues to be pushed out of the valve through outlet vent 42. When float 200 reaches its uppermost position in the internal chamber 100, the poppet valve 500 also reaches its highest point at which seat disc 508 on the top of the poppet valve seals the edge of the opening to outlet vent 42, and seat disc 405 seals the inlet in tip 504 of the poppet valve 500. These positions of the float 200 and poppet valve 500 are shown in FIG. 2. In this uppermost position, gas within the valve 10 cannot pass through the seal between the seat disc 508 and the outlet vent 42. Additionally, since tip 504 is seated on seat disc 405, thereby sealing the opening to channel 505, gas also cannot pass through poppet valve 500 and out of outlet vent 42.

If, for example, a gas such as air enters into the pipeline via a leak or some other means, the air will enter valve 10 displacing the liquid and causing the buoyant float 200 to drop. As float 200 drops, the pivotal linkage member 400 will pivot downwards. This in turn will unseat tip 504 of the poppet valve from the seat disc 405 in the pivotal linkage member 400. As a result, the valve can undergo degassing wherein gas within valve 10 can air, can enter channel 505 through tip 504, pass through central cavity 506 and out outlet 507 via the central opening 509 in seat disc 508. This position of the float 200 and poppet valve 500 are shown in FIG. 3. Thus, even though the pipeline is still under pressure, this small degassing passage will open. However, the major gas flow passage through the valve will still be closed so long as the pressure within the pipeline is sufficiently above the atmospheric pressure (i.e., above the pressure outside of outlet vent 42.

But, if a vacuum occurs within the pipeline, the liquid level in valve 10 will drop causing float 200 to fall, pivotal linkage member 400 to pivot further downwards, and poppet valve 500 to drop. This opens the major gas flow passage through the valve. As a result, atmospheric air enters into the valve through outlet vent 42, through the passages formed between positioning arms 302, pass around float 200, and out of inlet port 25. During such vacuum relief operation, the positions of the float 200 and the poppet valve 500 are those shown in FIG. 1.

Figure 4:
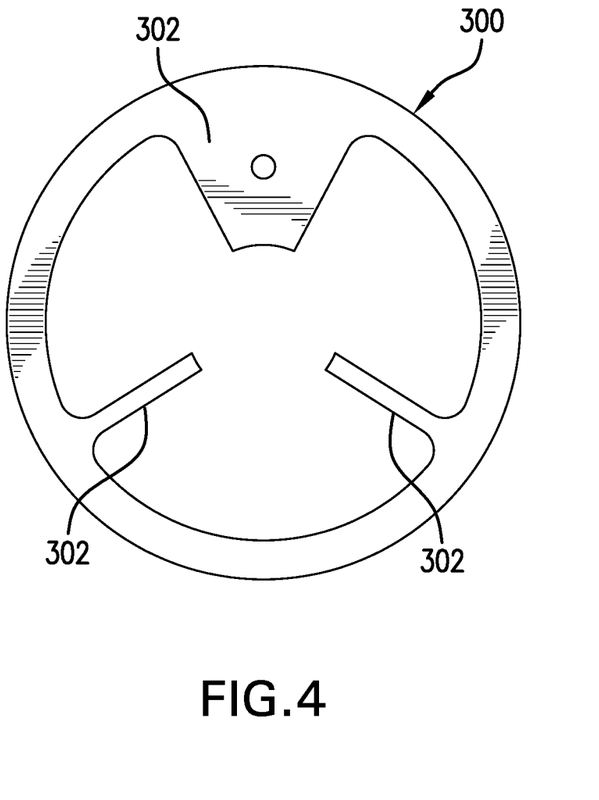
FIG. 4 illustrates a top view of the valve guide member.

FIG. 4 shows a top view of the valve guide member 300. As can be seen in FIG. 4, a plurality of positioning arms 302 extending inwardly from the ring-shaped outer edge region to define a central region in valve guide member 300. In this central region that poppet valve 500 is able to move up and down within the valve structure. Between positioning arms 302 there are passages that permit gases to pass through valve guide member 300. In addition, one of the positioning arms 302 is wedged-shaped and wider than the other positioning arms. This is to facilitate the attachment of a coupling member 301 to the bottom of the wedged-shaped positioning arm.

Figure 5:
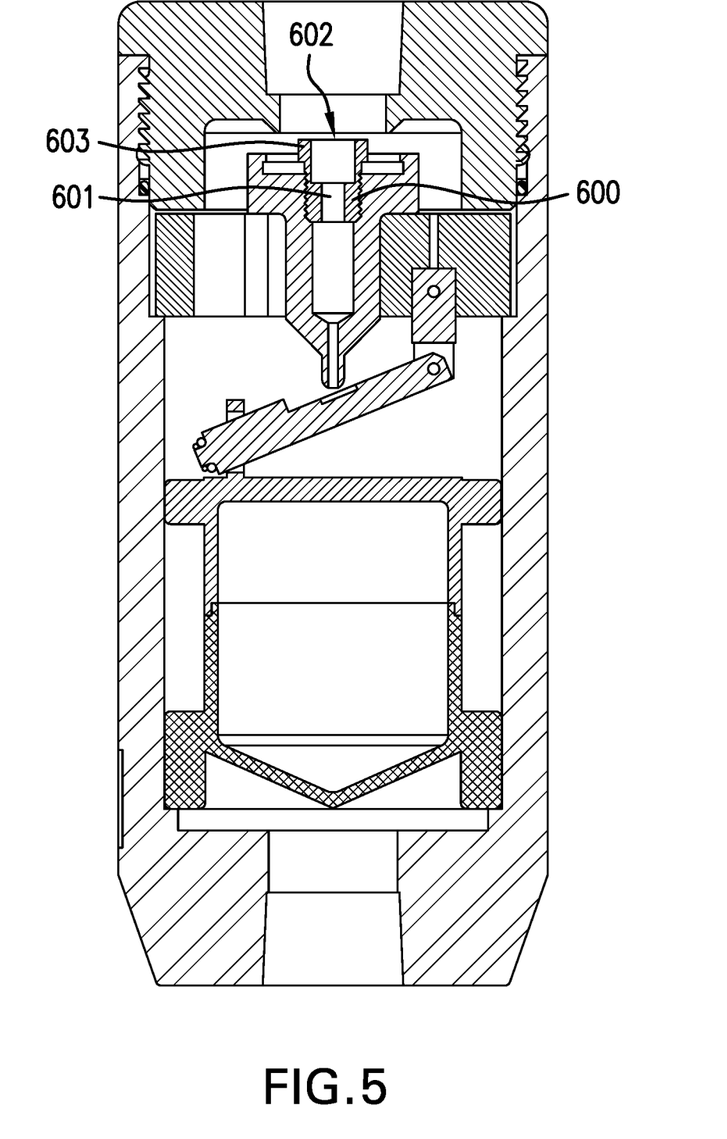
FIG. 5 illustrates an embodiment of the invention in which seat disc holder 600 is provided to prevent displacement of the seat disc on the top of the poppet valve.

According to a further variant of the invention, means are provided prevent displacement of the seat disc 508 on the top of the poppet valve. As shown in FIG. 5, the poppet valve 500 is provided with a seat disc holder 600. The seat disc holder 600 is inserted into outlet 507 of the poppet valve and is provided with external threads that engage internal threads within the top section of the central cavity 506. The main disc holder 600 has an internal passageway 601 leading an outlet 602 whereby a gas can flow into the inlet tip 504 of poppet valve 500, through the channel 505 and central cavity 506, through passageway 601 and 602, and exit the valve via through outlet vent 42.

The seat disc holder 600 is tapered in the downward direction. When screwed into the poppet valve, an upper edge 603 of the seat disc holder 600 engages the inner edge of the annular-shaped seat disc 508 and thereby helps keep the seat disc 508 in place. For example, if air gets underneath the main seat disc 508 (as shown in FIG. 1), it may cause inner edge of the seat disc to bulge up around the center around the outlet 507 of the poppet valve. The seat disc holder 600 functions to prevent the seat disc from bulging up.

In order to provide sufficient buoyancy the float 200 is preferably hollow and preferably filled with air or other appropriate gas. The float 200 is typically made of light weight plastic to permit sufficient buoyancy and to exhibit sufficient chemical resistance to the liquids and gases to which it may be exposed. The plastic used in the manufacture of the float needs to have a sufficient specific gravity to permit the float to move upwards and cause seat disc 508 to seal outlet vent 42 after a sufficient amount of gas is dispelled through the valve during degassing.

Suitable materials for the manufacture of the float include polyvinyl chloride (PVC), chlorinated polyvinyl chloride (CPVC), polypropylene (PP), polyvinylidene fluoride (PVDF), polyethylene (PE), and polystyrene (PS). PVC and CPVC are easily welded by the "solvent cement" method and thus are readily suitable for making the float as a weldment. Polypropylene and polyvinylidene fluoride (PVDF) are not easily "glued" and usually require heat and pressure to weld. The preferred materials for making the float are PVC and CPVC due to their chemical resistance and the ease of manufacturing the float from such materials.

As an alternative to the hollow body, the float may be made of a light weight closed cell foam. Here again, the material must be compatible with the environment, i.e., exhibit sufficient chemical resistance to the liquids and gases they may be exposed to, and the material must meet the weight requirements for the operation of the float as described above.

The poppet valve 500 is also preferably hollow in order to reduce its weight and facilitate its movement. However, unlike the float, the poppet valve must permit the passage of gases there through and thus cannot be sealed.

Suitable plastic materials include for the manufacture of the poppet valve are polyvinyl chloride (PVC), chlorinated polyvinyl chloride (CPVC), polypropylene (PP), polyvinylidene fluoride (PVDF), polyethylene (PE), and polystyrene (PS).

The valve housing, valve guiding member and lid can be made of metal, but, for reasons of chemical resistance, these parts are also preferably made of plastic. Here again, suitable plastic materials include polyvinyl chloride (PVC), chlorinated polyvinyl chloride (CPVC), polypropylene (PP), polyvinylidene fluoride (PVDF), polyethylene (PE), and polystyrene (PS). In general, since these parts do not have to move during operation of the valve, they can be made of heavier plastics than those used for the float and poppet valve.

The pivotal linkage member 400 is preferably made of light weight plastic such as polyvinyl chloride (PVC), chlorinated polyvinyl chloride (CPVC), polypropylene (PP), polyvinylidene fluoride (PVDF), polyethylene (PE), and polystyrene (PS). But, the pivotal linkage member could also be made of a light metal such as aluminum or titanium. Here again, the material must be compatible with the environment to which it is exposed, i.e., exhibit sufficient chemical resistance to the liquids and gases that come into contact with the pivotal linkage member. Also, the material must meet the weight requirements to permit efficient movement of the float, poppet valve and pivotal linkage member itself during operation of the valve.

The seat discs 405 and 508 can be made of any suitable rubber that is compatible with the fluid being handled. Suitable elastomers are ethylene propylene rubber (aka EPR or EPDM) and fluorocarbon rubber (aka FKM). Preferably, the elastomer has a hardness of 50 to 60 durometer (i.e., a 50 to 60 SHORE A hardness).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A valve comprising:
a housing having a longitudinal axis and a vertical wall having an internal surface which defines an internal chamber, said housing having a bottom end and an upper end, said bottom end having means for connection to a pipeline or liquid storage system, said housing having an inlet port at the bottom end of the housing to permit fluid communication between said internal chamber and said pipeline or liquid storage system, a housing cap attached to the upper end of the housing, an outlet vent in the housing cap for venting gas from the internal chamber and for permitting the entry of ambient gas into the internal chamber;
a float positioned within the internal chamber and being movable in a direction along the longitudinal axis within the internal chamber by liquid pressure;
a pivotal linkage member connected to the float whereby the pivotal linkage member pivots as the float moves up and down in the direction along the longitudinal axis,
a poppet valve which interacts with the pivotal linkage member whereby as the pivotal linkage member pivots upwards due to upwards movement of the float the pivotal linkage member contacts the poppet valve and moves the poppet valve upwards to a valve seat position around the outlet vent in the housing cap,
the poppet valve having an upper flange, a bottom inlet, a top outlet and a passageway connecting the bottom inlet and the top outlet whereby gas can pass through the bottom inlet, through the passageway, and discharge through the top outlet,
the pivotal linkage member having a valve seat which seals the bottom inlet of the poppet valve when the pivotal linkage member contacts the poppet valve, and
a valve guide member positioned above the float and below said upper flange of the poppet valve for guiding movement of the poppet valve in the direction along the longitudinal axis of the housing,
wherein a ridge or shoulder extends inward from an upper portion of the internal surface of said vertical wall thereby forming within said internal chamber a lower region below said ridge or shoulder having a first cross section and an upper region above said ridge or shoulder having a second cross section, wherein the first cross section has a smaller diameter than the second cross section,
wherein said float is movable within said lower region and said valve guide member is positioned within said upper region wherein said valve guide member rests on said ridge or shoulder, and
said poppet valve is not fastened to any other part of the valve, and said valve guide member, said pivotal linkage member and said float are not fastened to the housing or housing cap such that said poppet valve, said valve guide member, said pivotal linkage member and said float are removably positioned within the internal chamber when said housing cap is not attached to the upper end of the housing.

2. The valve according to claim 1, wherein one end of the pivotal linkage member is attached to the float and the other end is attached to the valve guide member.

3. The valve according to claim 1, wherein the float is free of spring bias.

4. The valve according to claim 1, wherein the poppet valve is free of spring bias.

5. The valve according to claim 1, wherein the valve is free of any spring bias.

6. The valve according to claim 1, wherein said means for connection to a pipeline or liquid storage system comprises internal threads in said inlet port at the bottom end of the housing.

7. The valve according to claim 1, wherein an upper end of the internal surface of said vertical wall is provided with internal threads for attaching said housing cap to the upper end of the housing.

8. The valve according to claim 1, wherein said housing and said internal chamber are both of cylindrical shape.

9. The valve according to claim 8, wherein said float has a cylindrical main body and an inverted conical bottom end.

10. The valve according to claim 9, wherein said valve guide member is ring shaped and comprises a plurality of positioning arms wherein ends of said positioning arms define a central region within said valve guide member within which said poppet valve can move up and down, and passages are provided between the positioning arms to permit gases to pass through said valve guide member.

11. The valve according to claim 10, wherein said upper end of the housing is provided with internal threads for attaching said housing cap to the upper end of the housing, and said valve guide member is held in place within the valve between said ridge or shoulder and a bottom edge of said housing cap.

12. The valve according to claim 1, wherein said float is provided with a plurality of leg members that extend outward from the float, and said leg members interact with a ridge that extends inward from a lower section of the internal surface of said vertical wall to prevent downward movement of the float.

13. The valve according to claim 1, wherein a bottom region of said float is provided with a plurality of leg members that extend outward from the float and a top region of said float is provided with a plurality of arm members that extend outward from the float, and said leg members and arm members interact with the internal surface of said vertical wall to guide said float as it moves up and down within said internal chamber.

14. The valve according to claim 1, wherein said float has a cylindrical main body and a conical bottom end.

15. The valve according to claim 1, wherein said float is connected to said pivotal linkage member by a first coupling member, said first coupling member comprising a wall which extends vertically from the top of said float, said wall having an elongated slot through which a first end of said pivotal linkage member extends, said first end of said pivotal linkage member having a groove in which an O-ring is mounted to retain said first end of said pivotal linkage member within said elongated slot.

16. The valve according to claim 1, wherein said valve guide member is connected to said pivotal linkage member by a second coupling member, said second coupling member comprising a protrusion which extends downward from said valve guide member, said protrusion having a slot therein, wherein a second end of said pivotal linkage member is received within the slot of said protrusion and held therein by a fastening means.

17. The valve according to claim 16, wherein said float is connected to said pivotal linkage member by a first coupling member, said first coupling member comprising a wall which extends vertically from the top of said float, said wall having an elongated slot through which a first end of said pivotal linkage member extends, said first end of said pivotal linkage member having a groove in which an O-ring is mounted to retain said first end of said pivotal linkage member within said elongated slot.

18. The valve according to claim 1, wherein said valve guide member comprises a plurality of positioning arms wherein ends of said positioning arms define a central region within said valve guide member within which said poppet valve can move up and down.

19. The valve according to claim 1, wherein said poppet valve further comprises a lower conical section and a central cylindrical section, wherein said upper flange extends outward from a top edge of said central cylindrical section.

20. The valve according to claim 19, wherein said poppet valve further comprises a top surface wherein a seat disc forms at least part of said top surface, and wherein said top outlet of said poppet valve is a central opening in said seat disc.

21. The valve according to claim 20, wherein said poppet valve further comprises a seat disc holder which is inserted into said top outlet of said poppet valve and aids in retaining said seat disc positioned at the top surface of said poppet valve.

22. The valve according to claim 1, wherein said upper end of the housing is provided with internal threads for attaching said housing cap to the upper end of the housing, and said valve guide member is held in place within the valve between said ridge or shoulder and a bottom edge of said housing cap.

\* \* \* \* \*